United States Patent [19]
Wild et al.

[11] Patent Number: 4,748,071
[45] Date of Patent: May 31, 1988

[54] DECAL FOR DECORATION WITH BRIGHT NOBLE METAL

[75] Inventors: Wolfgang Wild; Günter Landgraf, both of Hanau, Fed. Rep. of Germany

[73] Assignee: W. C. Heraeus GmbH, Hanau, Fed. Rep. of Germany

[21] Appl. No.: 34,682

[22] Filed: Apr. 6, 1987

[30] Foreign Application Priority Data

May 16, 1986 [DE] Fed. Rep. of Germany ....... 3616547

[51] Int. Cl.$^4$ ............................................. C04B 23/01
[52] U.S. Cl. .................................... 428/210; 428/914; 428/699; 428/542.2; 428/325; 428/434
[58] Field of Search ................................. 428/210–212, 428/914, 325, 542.2, 698, 699, 434

[56] References Cited

U.S. PATENT DOCUMENTS

| | | | |
|---|---|---|---|
| 1,647,362 | 11/1927 | Hughes | 428/914 X |
| 3,385,748 | 5/1968 | Neale et al. | 428/211 X |
| 4,292,103 | 9/1981 | Namura et al. | 428/914 X |
| 4,322,467 | 3/1982 | Heimbach et al. | 428/914 X |
| 4,533,605 | 8/1985 | Hoffman | 428/325 X |

*Primary Examiner*—Nancy A. B. Swisher
*Attorney, Agent, or Firm*—Felfe & Lynch

[57] ABSTRACT

By using a ceramic decal whose design layer consists of a bright noble metal preparation containing a thermoplastic resin and which is covered by a layer of a lead borosilicate glaze frit, it is possible to produce in a single firing a bright noble metal decoration protected by a glaze.

17 Claims, 1 Drawing Sheet

DECAL FOR DECORATION WITH BRIGHT NOBLE METAL

BACKGROUND OF THE INVENTION

The invention relates to a ceramic decal for decoration with bright noble metal, comprising a backing sheet, a pattern or design layer made from a bright noble metal preparation, and a cover-coat on an acrylate resin basis.

Bright noble metal preparations, such as bright gold, bright platinum and bright palladium, for the decoration of glass, porcelain, ceramic and the like, consist of solutions of organic gold, platinum and palladium compounds, usually the sulforesinates, in organic media, which burn off completely or volatilize in the firing, and usually contain still other organic metal compounds, for example the resinates and sulforesinates of rhodium, bismuth and silver. The preparations are applied to the article to be decorated and fired on at temperatures between 500° and 850° C.

For the application of the decoration to the article, transfers or decals are customarily used, whose design layer consists of the bright noble metal preparation, or contains it, in addition to ceramic vitrifiable pigments, for example.

Such a decal is disclosed, for example, in German Pat. No. 1,232,168. It consists of a gummed paper as backing sheet, a design layer made from a bright noble metal preparation, a protective coating of an oxidizable or polymerizable material containing an alkyd resin, phenolic resin, urea resin or epoxy resin, or a drying or semidrying oil and a cover-coat on an acrylic resin basis.

The bright noble metal layers, which are only about $10^{-4}$ mm thick, are very sensitive to mechanical damage and chemical attack, for example by acids and alkaline detergents (dishwashing detergents), so that they are not very suitable for the decoration of rigorous day-to-day-used tableware.

To render the fired on bright noble metal layers resistant to wear and scratching and more stable chemically, they can be coated with a protective glaze in a very complex process that requires a second firing. Such a protective glaze can be obtained, as known for example from German Auslegeschrift No. 1,233,769, from borosilicate glaze frits dispersed in an oily medium or vehicle. In this process it is necessary first to fire the decoration and then, in a second firing, to fire on the protective glaze. This dual firing is required because the reaction of the organic vehicle contained in the glaze frit preparation with the bright noble metal preparations would otherwise degrade the brilliance and strength of adhesion of the bright noble metal layers.

The invention is addressed to the objectives of creating a ceramic decal comprising a backing sheet, a pattern or design layer made from a bright noble metal preparation, and a cover-coat on an acrylate resin basis, by which bright noble metal decorations protected by a transparent, colorless glaze layer on hard porcelain, soft porcelain, earthenware or enamel can be produced in a less expansive and cost-saving and energy-saving manner.

SUMMARY OF THE INVENTION

These as well as other objectives are achieved, according to the present invention, in that the design layer consists of a bright noble metal preparation containing a thermoplastic resin, and between the design layer and cover-coat there is disposed a layer which contains a colorless, transparent, lead borosilicate glaze frit.

Especially suitable bright noble metal preparations for making the design layer are the known bright gold, bright platinum and bright palladium preparations.

The thermoplastic resin can be a natural resin or a synthetic resin, and is contained in the bright noble metal preparation in the amount of 8 to 30 weight-percent, preferably 10 to 20 weight-percent.

The decal according to the invention has proven especially valuable when the thermoplastic resin is an asphaltic resin, a polyamide resin, a maleate resin, a phenolic resin, a ketone resin or an epoxy resin, and the glaze frit consists of:

| | |
|---|---|
| 20 to 55 | weight percent PbO |
| 25 to 50 | weight percent $SiO_2$ |
| 4 to 16 | weight percent $B_2O_3$ |
| 0 to 5 | weight percent $Al_2O_3$ |
| 0 to 3 | weight percent $Na_2O$ |
| 0 to 3 | weight percent $K_2O$ |
| 0 to 3 | weight percent $Li_2O$ and |
| 0 to 3 | weight percent ZnO, | and preferably of:

| | |
|---|---|
| 55 | weight percent PbO |
| 33 | weight percent $SiO_2$ |
| 5 | weight percent $B_2O_3$ |
| 3 | weight percent $Al_2O_3$ |
| 2 | weight percent $Na_2O$, and |
| 2 | weight percent ZnO. |

Quite surprisingly it has been found that the addition of the thermoplastic resin to the bright noble metal preparations prevents any impairment of the bright noble metal layers by the organic vehicle contained in the glaze frit layer during the firing.

The bright noble metal layers produced with the decal according to the invention in a single firing and protected by the glaze layer have a beautiful, high gloss, and are both mechanically and chemically resistant, so that they are especially well suited for the decoration of porcelain, earthenware and enamelware intended for use in hotels and gastronomy.

The glaze layers have a thickness of about 5 to 30 micrometers, preferably 10 to 20 micrometers.

In certain cases it has been found desirable for the decal additionally to have a lacquer film disposed between the design layer and the glaze frit layer, especially on the basis of a cellulose ester or ether or of an acrylate resin.

BRIEF DESCRIPTION OF THE DRAWING

Examples of the decals according to the invention are represented in cross section in FIGS. 1 and 2. The decal according to FIG. 1 consists of the backing sheet 1, the design layer 2, the glaze frit layer 4 and the cover-coat 5. The decal according to FIG. 2 additionally has the lacquer film 3.

DESCRIPTION OF THE PREFERRED EMBODIMENTS

Figure 1:
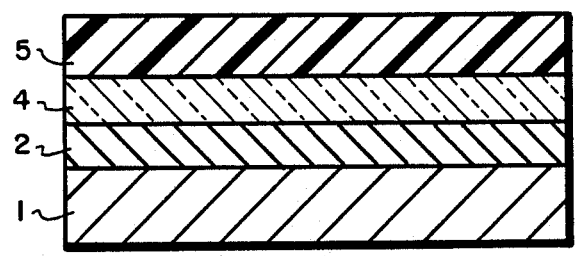
Figure 2:
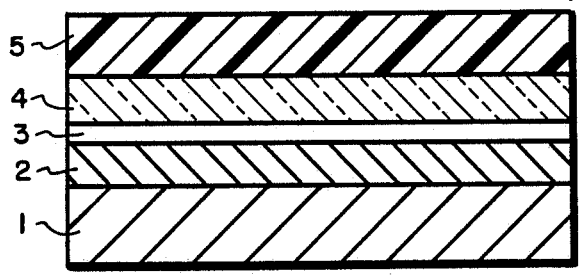

The production of the decal according to the invention is accomplished especially, as known and as described, for example, in the German Pat. No. 1,232,168, by means of the silk screen printing method by the successive application of the fluid to pasty materials forming the individual layers, beginning with the printing of the bright noble metal preparation forming the design layer onto the backing sheet.

The backing sheet 1 can consist of any suitable material and can be provided with a water-soluble or heat-soluble coating.

The paste forming the glaze frit layer consists of a dispersion of 20 to 80 weight-percent, preferably 65 weight-percent, of the finely divided glaze frit in a known screen printing medium consisting of a solution of about 30 to 50 weight-percent, frequently 40 weight-percent, of an organic polymer, especially a polymethacrylate or cellulose ester or ether, in a solvent composed, for example, of high-boiling aromatic hydrocarbons. The glaze frit layer in the finished ceramic decal then consists of about 33 to 93 weight-percent, preferably 79 to 86 weight-percent, of the glaze frit and of about 7 to 67 weight-percent, preferably about 14 to 21 weight-percent, of the organic polymer.

A solution containing an acrylate resin has proven especially valuable as the material for the cover-coat (see, for example, German Pat. No. 1,232,168).

The decal according to the invention is suitable especially for the decoration of hard porcelain, soft porcelain, earthenware and enamel.

The bright noble metal decoration protected by the glaze layer is produced by applying the decal to the object being decorated, and firing at temperatures between 750° and 850° C.

For further explanation, the production of a ceramic decal according to the invention and that of a bright gold decoration protected by a glaze will be described hereinbelow.

EXAMPLE

The composition of the materials used in producing the individual layers of the ceramic decal is as follows:

1. Thermoplastic resin containing bright gold preparation:

| | |
|---|---|
| Gold sulforesinate, 54.5% Au | 22 wt. % |
| Rhodium sulforesinate, 15% Rh | 0.4 wt. % |
| Bismuth resinate solution in essential oils, 5% Bi | 3 wt. % |
| Chromium resinate solution in essential oils, 3% Cr | 0.8 wt. % |
| | 0.8 wt. % |
| Silicon resinate solution in essential oils, 6% Si | 0.2 wt. % |
| Schenectady SP 126 phenolic resin made by Schenectady, U.S.A. | 16 wt. % |
| Cyclohexanol | 14 wt. % |
| Solvent naphtha 150 | 18 wt. % |
| Pine oil | 20.6 wt. % |
| Thickening agent | 3 wt. % |
| Silicone-base antifoaming agent | 2 wt. % |

2. Material for the lacquer film:

| | |
|---|---|
| Cellulose acetobutyrate | 18 wt. % |
| Ethylene glycol monoethyl ether acetate | 61 wt. % |
| Diacetone alcohol | 15 wt. % |
| CEL plasticizer (phthalic acid glycol ester) | 6 wt. % |

3. Glaze frit material for glaze frit layer:

| weight percent, a glaze frit composed of: | |
|---|---|
| PbO | 55 wt. % |
| SiO | 33 wt. % |
| $B_2O_3$ | 5 wt. % |
| $Al_2O_3$ | 3 wt. % |
| $Na_2O$ | 2 wt. % |
| ZnO | 2 wt. % |
| weight-percent, a solution of: | |
| polybutylmethacrylate | 40 wt. % |
| Solvent naphtha 150 | 60 wt. % |

4. Solution for the cover-coat:

| | |
|---|---|
| Polybutylmethacrylate | 38 wt. % |
| Dibutylphthalate | 4 wt. % |
| Silicone-base antifoaming agent | 0.1 wt. % |
| Solvent naphtha 100 | 57.9 wt. % |

First the bright gold preparation and then the paste forming the lacquer film are screen printed on a backing sheet of Metapaper, a paper provided with a water-soluble coating for ceramic decals, through a screen of 130 meshes per centimeter consisting of polyester fabric with fiber thickness T. Then follows the screen printing of the glaze frit paste through a screen of 100 meshes per centimeter consisting of polyester fabric of fiber thickness T and the screen printing of the solution forming the cover-coat through a screen of 32 meshes per centimeter consisting of polyester fabric of fiber thickness HD.

The decal is then transferred to a dinner plate of hard porcelain and fired at 800° C. The plate comes from the kiln with a bright gold decoration protected by a colorless, transparent glaze layer.

To test the strength of adhesion of the gold decoration, a wad-like steel wool ball with a diameter of 1 cm is placed on the decorated dinner plate and pressed down with a weight of 140 g. Then the dinner plate is rotated horizontally with the steel wool ball stationary, and the alteration of the gold decoration due to wear is determined.

The dinner plate, decorated by means of the decal according to the invention, shows no damage of the decoration event after 5000 revolutions. In contrast, the bright gold on a dinner plate decorated in the conventional manner is slightly damaged after 10 revolutions, about half-ruined after 50 revolutions, and completely rubbed away after 500 revolutions.

Although the invention relates to a ceramic decal for the production of bright noble decorations covered with colorless, transparent, protective glaze layers, it is nevertheless possible, by the addition of matting agents such as tin dioxide, titanium dioxide and zirconium dioxide to the glaze frit, to obtain noble metal decorations coated with matt protective glazes.

There has thus been shown and described a novel ceramic decal for bright noble metal decoration which fulfills all the objects and advantages sought therefor. Many changes, modifications, variations and other uses and applications of the subject will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. In a ceramic decal for bright noble metal decoration, comprising a backing sheet, a design layer comprising a bright noble metal, and a cover-coat on an acrylate resin basis, the improvement wherein said design layer comprises a composition comprising a bright noble metal and a thermoplastic resin, and between the design layer and cover-coat there is disposed a layer which contains a colorless, transparent, lead borosilicate glaze frit.

2. A decal according to claim 1, wherein said bright noble metal preparation contains 8 to 30 weight-percent of said thermoplastic resin.

3. A decal according to claim 2, wherein said bright noble metal preparation contains 10 to 20 weight-percent of said thermoplastic resin.

4. A decal according to claim 1, wherein said thermoplastic resin is an asphaltic resin.

5. A decal according to claim 1, wherein said thermoplastic resin is a polyamide resin.

6. A decal according to claim 1, wherein said thermoplastic resin is a maleate resin.

7. A decal according to claim 1, wherein said thermoplastic resin is a phenolic resin.

8. A decal according to claim 1, wherein said thermoplastic resin is a ketone resin.

9. A decal according to claim 1, wherein said thermoplastic resin is an epoxy resin.

10. A decal according to claim 1, wherein said glaze frit layer consists of 33 to 93 weight-percent of a glaze frit and 7 and 67 weight-percent of an organic polymer.

11. A decal according to claim 10, wherein said glaze frit layer consists of 79 to 86 weight-percent of said glaze frit and 14 to 21 weight-percent of said organic polymer.

12. A decal according to claim 10, wherein said glaze frit consists of 20 to 55 weight-percent PbO, 25 to 50 weight-percent $SiO_2$, 4 to 16 weight-percent $B_2O_3$, 0 to 5 weight-percent $Al_2O_3$, 0 to 3 weight-percent $Na_2O$, 0 to 3 weight-percent $K_2O$, 0 to 3 weight-percent $Li_2O$, and 0 to 3 weight-percent ZnO.

13. A decal according to claim 12, wherein said glaze frit consists of approximately 55 weight-percent PbO, 33 weight-percent $SiO_2$, 5 weight-percent $B_2O_3$, 3 weight-percent $Al_2O_3$, 2 weight-percent $Na_2O$ and 2 weight-percent ZnO.

14. A decal according to claim 10, wherein said organic polymer consists of a polymethacrylate.

15. A decal according to claim 14, wherein said organic polymer consists of polybutylmethacrylate.

16. A decal according to claim 1, further comprising a lacquer film disposed between the design layer and the glaze frit layer.

17. A decal according to claim 1, wherein said bright noble metal preparation is a bright gold preparation.

* * * * *